United States Patent [19]

Kampf

[11] 3,754,281

[45] Aug. 21, 1973

[54] RECTILINEAR STYLUS SYSTEM FOR CHART RECORDER

[75] Inventor: Richard S. Kampf, Costa Mesa, Calif.

[73] Assignee: Beckman Instruments, Inc., Fullerton, Calif.

[22] Filed: Jan. 17, 1972

[21] Appl. No.: 218,141

[52] U.S. Cl. ................ 346/139 R, 74/89.21, 74/99, 346/139 B

[51] Int. Cl. ........................................... G01d 15/24

[58] Field of Search .................... 346/117 A, 117 R, 346/139 B, 139 A, 139 R; 74/99, 103, 89.2, 89.21, 89.22

[56] References Cited

UNITED STATES PATENTS

| | | | |
|---|---|---|---|
| 2,442,586 | 6/1948 | Clark | 346/117 A X |
| 2,835,549 | 5/1958 | Murdoch et al. | 346/139 R X |
| 3,009,355 | 11/1961 | Abs et al. | 346/117 A X |

*Primary Examiner*—Joseph W. Hartary
*Attorney*—Paul R. Harder and Robert J. Steinmeyer

[57] ABSTRACT

A stylus arm adapted to track along a rectilinear marking path extending across at least one channel of a chart recorder. The free end of the stylus arm carries a stylus adapted to engage the chart, and a guide bearing adapted to engage an elongate guide surface to guide the stylus along the rectilinear path. The constrained end of the stylus arm includes a U-shaped portion which engages a recessed channel in a mounting pin secured to the support platform, so that the stylus arm is both pivotably and slidably mounted with respect to the platform. Means are provided for driving the free end of the stylus arm from one side of the channel to the other, with the effective length of the stylus arm being extended as it approaches the outer reaches of the channel to permit the stylus to track along the rectilinear marking path.

5 Claims, 4 Drawing Figures

PATENTED AUG 21 1973 3,754,281

SHEET 1 OF 2

RECTILINEAR STYLUS SYSTEM FOR CHART RECORDER

BACKGROUND OF THE INVENTION

The present invention covers an improved stylus arm for use with chart recorders. More particularly the invention relates to a stylus arm adapted to track along a rectilinear marking path extending across at least one channel of a chart recorder.

In using analog recording devices, such as chart recorders, it is desired to provide means for recording an analog representation of electrical signals upon a strip chart by means of a movable pen or stylus. One common way of suspending the stylus is to mount it at the movable end of a pivotable stylus arm, and to provide motive means for pivoting the stylus arm in response to the electrical signals to be recorded, so that the movement of the stylus is proportional to the electrical signals.

The use of a pivotable stylus arm results in traces which are curvilinear, since the stylus tracks along a radial path or arc determined by the length of the stylus arm as it moves about its pivot point. Consequently it is necessary, in interpreting results recorded by such equipment, to compensate for the curvilinear marking path traced by the stylus. Such curvilinear recording is undesirable in that error can be introduced into the data reduced from the chart during the interpretation thereof. Furthermore, it is desirable that rectilinear recording be utilized to simplify the reduction of data from the chart.

In using chart recorders, it is also desirable to provide a number of recording channels, all including recording stylii or pens capable of marking the chart simultaneously. Therefore, it is desirable to minimize the space between channels to provide a compact design for the recorder.

It is also desirable to provide a continuous writing system which will result in sharp, easily visible traces without wetting or tearing the chart paper of the recorder, as sometimes occurs with pen and ink systems.

SUMMARY OF THE INVENTION

It is a general object of the invention to provide an improved writing system and stylus arm especially adapted for use with a chart recorder. The stylus arm provides a rectilinear trace of analog signals, and is susceptible of installation within a compact module for convenient use in multi-channel recorders. Furthermore, the stylus arm is easily adapted for use with pressure sensitive paper, or pen andd ink systems, and enables the use of minimal space between recording channels.

The stylus system comprises an elongate stylus arm having a stylus secured at its free end for movement along a rectilinear marking path extending across a chart over at least the width of one recording channel. The free end of the stylus arm also is provided with a guide bearing, adapted to engage a corresponding elongate guide surface, which serves to guide the stylus along the desired rectilinear path. The constrained end of the stylus arm includes a U-shaped portion, adapted to engage a recessed channel formed in the periphery of a stylus arm mounting pin which is secured to the stylus arm platform. The U-shaped portion both slidably and pivotably engages the support pin. Therefore, the effective length of the stylus arm can be increased as the arm pivots toward the outer reaches of the recording channel so that the stylus is able to traverse the rectilinear marking path.

Drive means are provided for selectively pivoting the stylus arm to move the stylus back and forth across the recording channel. The drive means comprise an endless, flexible chain driven by a servomotor-operated sprocket. The chain is guided between guide rails that are supported upon the platform parallel to the bearing guide surface and transverse to the length of the stylus arm. A pin secured to the chain is slidably retained in a slot within the lower surface of the stylus arm. Accordingly, as the chain is driven in either of two opposite directions, the pin moves the stylus arm back and forth with respect to the recording channel, enabling the effective length of the stylus arm to be adjusted to the extent necessary to permit the guide bearing to engage the guide surface so that the stylus tracks along the rectilinear marking path.

A potentiometer resistance element is suspended beneath the stylus arm, and a wiper on the stylus arm contacts the potentiometer element to develop a stylus position signal which is utilized in a conventional feedback type circuit to reduce the stylus position error.

BRIEF DESCRIPTION OF THE DRAWINGS

These and other advantages of the invention will become more apparent when the following detailed description of the invention is considered with the accompanying drawings wherein.

DETAILED DESCRIPTION OF THE INVENTION

Figure 1:
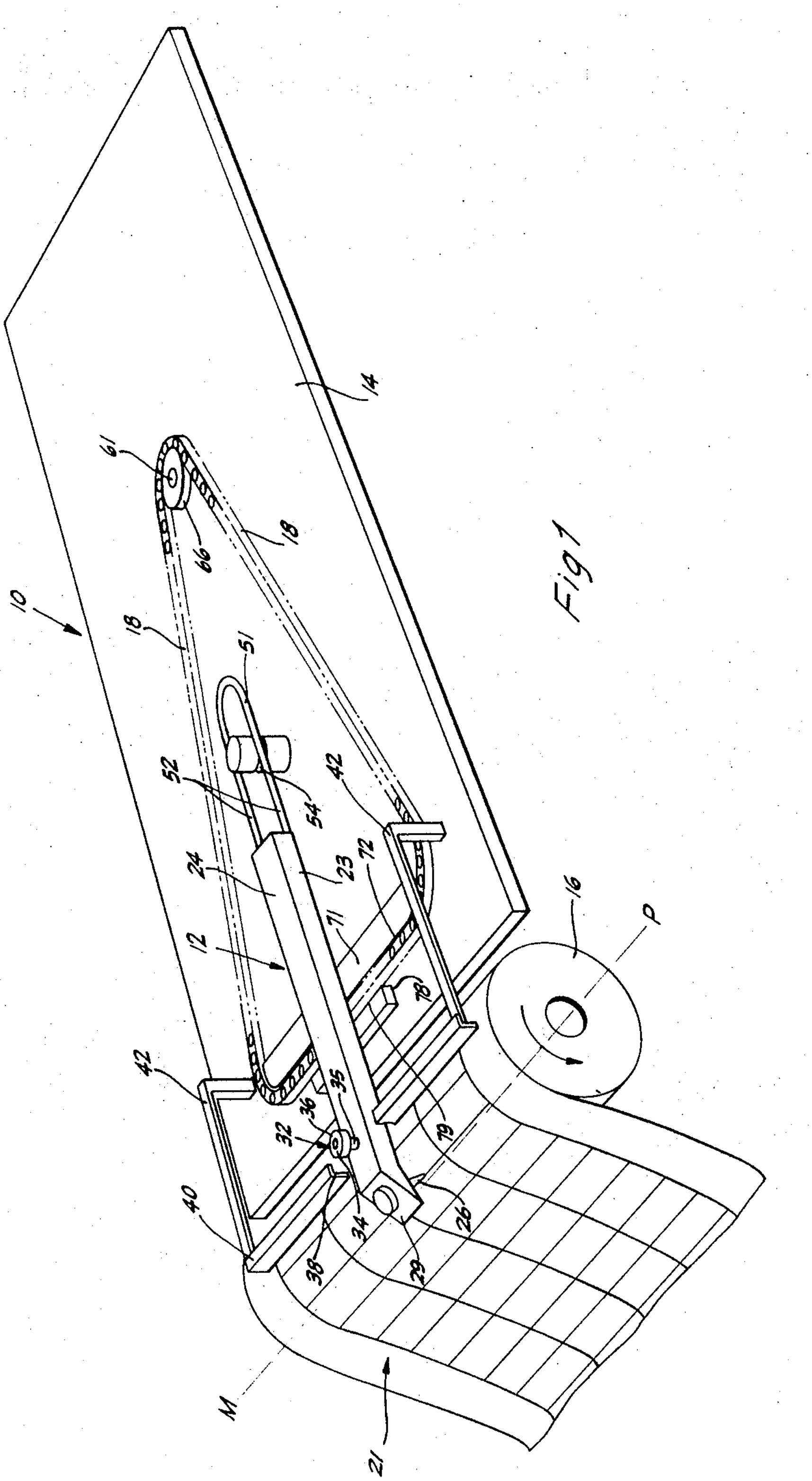
FIG. 1 is a diagrammatic perspective view of one embodiment of the invention.

Referring now to the drawings and particularly to FIG. 1, a rectilinear stylus system is generally indicated at 10 including a stylus arm 12 supported upon a platform 14, adapted for movement with resoect to a chart paper roll 16 under the force of a chain 18 driven by servomotor 20 (see FIG. 2) which is mounted on the underside of platform 14.

Platform 14 can be fabricated of any suitable material, such as cast or rolled metal. The platform is illustrated as extending across the entire width of the chart paper roll. However it should be apparent that platform 14 could be fabricated of suitable dimensions, and otherwise designed to be mounted, along with the stylus arm and driving mechanism mounted thereon, as a modular unit within a multi-channel chart recorder.

Roll 16 is of conventional form and is rotatably supported beneath the stylus arm, by means not illustrated. The roll is adapted to carry a conventional chart, such as chart 21 illustrated in FIG. 1 and to move the chart with respect to the stylus arm as the chart roll is rotated in the direction indicated by the arrow in FIG. 1. It should be apparent that other types of charts could be utilized with the stylus arm system described herein; and that one or more stylus arms of the type described could be utilized with a single chart mounted on a long chart roll of the type illustrated in FIG. 1.

In the embodiment illustrated chart 21 is formed of pressure sensitive paper and the stylus arm is, accordingly, provided with a relatively high pressure stylus adapted to contact the chart and form a visible trace thereon. However it should be apparent that the stylus arm could be utilized in a pen and ink system, although such is not preferred. Chart 21 is shown with appropriate background markings for a single recording channel, although other arrangements could be utilized. A dotted line MP extending across the chart represents a rectilinear marking path which the stylus tracks along.

Stylus arm 12 is of elongate shape and includes a main body section 23 having a cover 24 provided thereon in FIG. 1. The stylus arm is illustrated with the cover removed in FIG. 2. The outer or free end of the stylus arm is provided with a stylus 26 comprising a tapered pin suitable secured in an opening 27 formed through a face 29 at the outer end of the stylus arm. The small end of the pin or stylus can comprise any desired shape and rests in writing position against the chart to act as a support for the outer end of the stylus arm. If desired the stylus can comprise a pen of an ink writing system.

The free end of the stylus arm is also provided with a guide bearing 32 comprising a conventional roller bearing having an inner race 34 fixedly secured to a pin 35 that extends upwardly from the top of the stylus arm, and a rotatable outer race 36 adapted to engage a guide surface 38 of a bearing guide 40. Guide 40 comprises an elongate angular member extending across one end of platform 14 above the chart roll 16. The bearing guide is connected at either end to L-brackets 42 secured to platform 14. Guide surface 38 is oriented at a vertical attitude with respect to platform 14 and extends parallel to the elongate axis of chart roll 16. Furthermore, guide surface 38 is positioned laterally with respect to the axis of chart roll 16 such that, with outer race 36 of guide bearing 32 in contact with the guide surface, the center axis of pin 35 is directly over the rectilinear marking path on chart 21 along which stylus 26 should track. Finally, the length of stylus 26 is adjusted so that the tip of the stylus is aligned with and intersects the center axis of pin 35.

Accordingly, with outer race 36 of the guide bearing in engagement with guide surface 38, stylus 26 consistently will track along the desired rectilinear path extending across chart 21. It should be noted that any tendency of the stylus arm to retreat from the guide surface is minimized, since the stylus engages the chart at a point well below the top elevation of the chart. Since the chart roll is rotated in the direction indicated by the arrow the stylus arm is continuously driven towards the guide surface. The effect of chart rotation is further enhanced by the writing pressure on the stylus, exerted by means explained hereinafter.

The constrained or fixed end of the stylus arm includes a U-shaped portion 51 which extends from the lower end of body 23. The inner surfaces 52 of the U-shaped portion are adapted to seat within and slidably engage a recessed channel 54 formed about the upper periphery of a stylus arm mounting pin 56 secured to the upper surface of platform 14. The center of pin 56 defines the pivot point for stylus arm 12. However, it should be apparent that the stylus arm is also slidable with respect to pin 56 so that the effective length of the stylus arm varies as the arm moves towards either outer edge of the recording channel. Accordingly, the guide bearing is permitted to remain in engagement with guide surface 38 and the desired rectilinear tracking path for stylus 26 is maintained.

Figure 2:
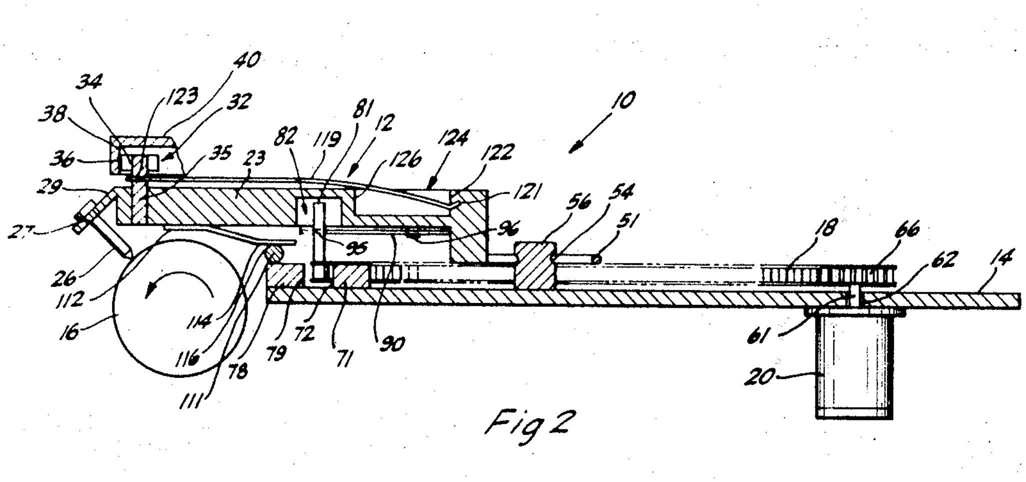
FIG. 2 is a diagrammatic side view, in partial section, of the stylus arm system illustrated in FIG. 1.

Pressure upon the stylus is provided by an elongate curved spring 119 best seen in FIG. 2. Sprinng 119 extends longitudinally of the stylus arm, having one end engaged in an opening 121 formed in one end wall 122 bounding recess 124 provided in the main body of the stylus arm, near the pivot point. The other end of the spring is engaged in an opening 123 formed through pin 35. The location of openings 121, 123 are such that the center portion of the spring engages an upwardly extending shoulder 126 formed on the upper side of the stylus arm. Furthermore, spring 119 is formed so that it normally forces pin 35 up and therefore forcs the stylus arm down by exerting force on shoulder 126 of the arm to exert writing pressure upon the stylus. A spring having sufficient force to produce any desired writing pressure can be selected. Likewise, other suitable means for producing pressure on the stylus can be used.

Pivotal movement of stylus arm 12 is effected by chain 18 in response to the rotation of motor 20 in either of two opposite directions. Referring particularly to FIGS. 1 and 2, motor 20 is secured to the under side of platform 14, with its shaft 61 extending through an opening 62 in the platform. A sprocket 66 is secured to shaft 61 for rotation therewith. Gear 66 drivingly engages chain 18, which in the embodiment illustrated, comprises an endless link type chain. Other types of flexible ends members could be used. Chain 18 is trained around a guide bar 71 suitably secured to platform 14 with an inner vertical surface 72 positioned parallel to the rectilinear tracking path of the stylus. Bar 71 is preferably fabricated of nylon or some other material having a low coefficient of friction, and its outer ends are formed with curved portions 72 defining a suitable arc to permit chain 18 to be driven therearound smoothly. Accordingly the use of idler sprockets at the ends of member 71 is not necessary. Another guide bar 78 is also secured on platform 14 with a vertical inner surface 79 oriented parallel with and facing surface 72. These two surfaces cooperate to form a guide channel for chain 18.

Figure 4:
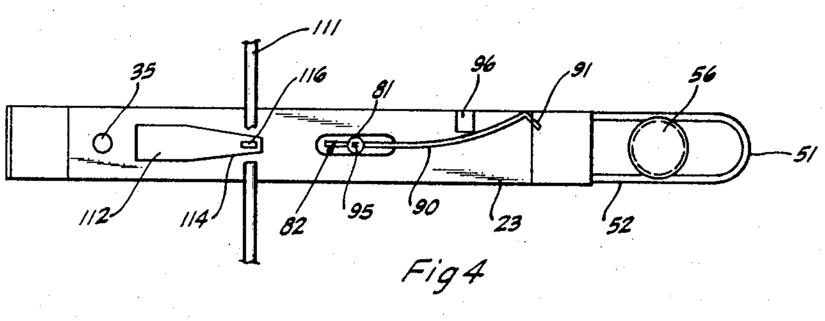
FIG. 4 is a diagrammatic bottom view of the stylus arm illustrated in FIG. 1.

A pin 81 is secured to an upper side of a link of chain 18 and extends upwardly a sufficient distance to rest within an elongate slot 82 formed in the bottom of the stylus arm as best illustrated in FIGS. 2 and 4. An elongate spring 90 is provided, having one end secured within a suitable opening 91 formed in the under side of body 23 of the stylus arm, and having its other end secured in an opening 95 formed through pin 81. As is best shown in FIG. 4, the center portion of spring 90 is engaged by a detent 96 formed on the under side of body 23 of the stylus arm so that the flexed spring exerts pressure against the pin and retains it firmly against one side of slot 82 of the stylus arm to prevent any transverse movement therebetween. Therefore, as motor 20 rotates in either of two opposite directions, chain 18 is moved transversely with respect to the stylus arm and drives the latter back and forth across the chart roll. In view of the slidable movement of the constrained end of the stylus arm at its pivot point, and the movement of pin 81 in slot 82, the free end of stylus arm can follow the desired rectilinear motion.

Referring again to FIGS. 2 and 4, an elongate potentiometer resistance element 111 is mounted upon bar 78 extending parallel with surface 79. An elongate spring member 112 is secured to the bottom of the stylus arm, having an outer end 114 that extends transverse to the potentiometer. An electrical contact 116 in the form of a thin wire is secured to the under side of the spring member, adapted to engage the uppr surface of the potentiometer as the stylus moves with respect thereto. Contact 116 serves as a wiper for the potentiomter and develops a stylus arm position signal which is supplied to a conventional potentiometric feedback control system.

Figure 3:
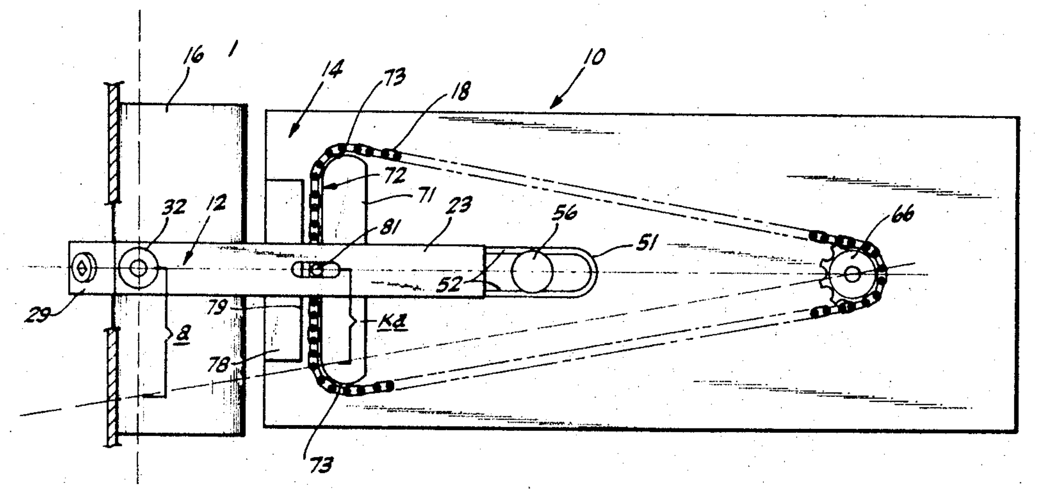
FIG. 3 is a diagrammatic partial top view of the stylus system illustrated in FIGS. 1 and 2.

Referring now to FIG. 3, it should be apparent that the position of the stylus arm and stylus at any particular instance is directly proportional to the linear displacement of pin 81 from its dead center position. Thus movement of the stylus through a distance *a*, to a location near the side of the chart, is caused by movement of pin 91 through a corresponding distance K*a*, where K is a constant. Accordingly, accurate control of the location of the stylus is easily effected.

It should be apparent that the stylus arm system described herein is advantageous in that it provides a pivotable stylus arm which is capable of tracking along a rectilinear marking path. Furthermore the system described utilizes a pressure responsive paper and thereby eliminates the problems that occur with pen and ink systems. In addition the invention can be fabricated in a compact design of modular configuration which can be conveniently used with multi-channel recorders of small size and light weight.

What is claimed is:

1. A stylus arm with a stylus adapted to track along a rectilinear marking path extending across at least one channel of a chart comprising, a support platform arranged proximate to said chart, having a mounting pin secured to an upper surface thereof and having a guide surface supported therefrom proximate to said chart and parallel to said rectilinear marking path;

an elongate arm having a free end provided with a stylus adapted to write upon said chart, and having a constrained end oriented proximate said support platform;

mounting means connecting the constrained end of said arm and the mounting pin for pivotably and slidably mounting said arm with respect to said support platform;

guide means secured upon the free end of said arm for engaging the guide surface of said platform so that said stylus tracks along said rectilinear marking path across at least one channel of said chart; and power means connected to said platform and said arm for selectively moving said arm so that the free end of said arm traverses across said chart, said power means including a motor-driven, endless chain, guide means for training a portion of said chain along a course parallel to said guide surface and said rectilinear marking path, and pin means for slidably securing said chain to said stylus arm whereby transverse motion of said stylus arm is accompanied by extension or retraction of said arm with respect to said mounting pin whereby the guide means on said arm is retained in engagement with said guide surface supported on said mounting platform.

2. The stylus arm of claim 1 further including sensing means secured between said arm and said platform for developing a position signal proportional to the position of said arm, said sensing means being parallel to said guide surface and said endless chain guide means.

3. The stylus arm of claim 1 further including means for exerting downward pressure upon said arm whereby the stylus is moved into contact with said chart with a predetermined force.

4. The stylus arm of claim 1 wherein the mounting pin upon said platform comprises a cylindrical pin having a recessed channel formed about the outer periphery thereof near the upper end, and wherein said mounting means comprises a U-shaped portion extending from the constrained end of said arm, with the inner surfaces of said U-shaped portion engaging the channel in said mounting so that the stylus arm is pivotably and slidably secured to said platform.

5. The stylus arm described in claim 1 wherein said guide surface is an elongate, straight surface of a guide bar secured to brackets extending from said support platform, said guide bar being positioned over said chart, oriented parallel to the rectilinear marking path, the axis of rotation of said chart being located between the guide surface of said guide bar and said mounting pin secured to the upper surface of said support platform; and wherein said guide means comprises a roller bearing secured on the upper end of a pin secured to the top surface of said stylus arm, with an outer race of said roller bearing adapted to engage said guide surface, the point of contact of said stylus with said chart being approximately on the axis of said roller bearing, the axis of rotation of said chart being located between the axis of said roller bearing and said mounting pin secured to the other surface of said support platform whereby rotation of said chart in one direction tends to bias the outer race of said roller bearing against said guide surface.

* * * * *